US009263069B2

(12) United States Patent
Taratorin

(10) Patent No.: US 9,263,069 B2
(45) Date of Patent: Feb. 16, 2016

(54) SPECTRAL NOISE ANALYSIS FOR READ HEAD STRUCTURES

(71) Applicant: Infinitum Solutions, Inc., Santa Clara, CA (US)

(72) Inventor: Alexander M. Taratorin, Palo Alto, CA (US)

(73) Assignee: Infinitum Solutions, Inc., Santa Clara, CA (US)

( * ) Notice: Subject to any disclaimer, the term of this patent is extended or adjusted under 35 U.S.C. 154(b) by 0 days.

(21) Appl. No.: 13/794,404

(22) Filed: Mar. 11, 2013

(65) Prior Publication Data

US 2013/0294210 A1 Nov. 7, 2013

Related U.S. Application Data

(60) Provisional application No. 61/643,016, filed on May 4, 2012.

(51) Int. Cl.
| | |
|---|---|
| *G11B 5/455* | (2006.01) |
| *G11B 5/127* | (2006.01) |
| *G11B 5/02* | (2006.01) |
| *G11B 5/31* | (2006.01) |

(52) U.S. Cl.
CPC .............. *G11B 5/455* (2013.01); *G11B 5/3166* (2013.01); *G11B 5/3189* (2013.01)

(58) Field of Classification Search
CPC .................. G11B 5/3176; G11B 5/315; G11B 11/10552; G11B 11/10554; G11B 5/3166; G11B 5/3189; G11B 5/3196; G11B 5/455; G11B 27/36; G11B 19/048; G11B 20/10009; G11B 20/1816; G11B 5/3173; G11B 5/3967; G11B 5/6011; G11B 5/6029; G01R 33/1207; H02P 6/182

USPC ............ 360/75, 110, 31, 65, 39, 62; 324/527, 324/529; 369/53.38, 322

See application file for complete search history.

(56) References Cited

U.S. PATENT DOCUMENTS

| | | | | |
|---|---|---|---|---|
| 2003/0026029 A1* | 2/2003 | Kuroe et al. | | 360/66 |
| 2008/0049351 A1* | 2/2008 | Yamanaka et al. | | 360/59 |
| 2010/0097717 A1* | 4/2010 | Bonvin | | 360/75 |
| 2011/0242693 A1* | 10/2011 | Hayashi | | 360/31 |
| 2012/0127605 A1* | 5/2012 | Granger-Brown et al. | | 360/75 |
| 2013/0172716 A1* | 7/2013 | Lozano et al. | | 600/378 |

OTHER PUBLICATIONS

Klaassen et al. (Broad-Band Noise Spectroscopy of Giant Magnetoresistive Read Heads), IEEE Transactions on Magnetics, vol. 41, No. 7, Jul. 2005, pp. 2307-2317.*

* cited by examiner

*Primary Examiner* — Dionne H Pendleton
(74) *Attorney, Agent, or Firm* — Silicon Valley Patent Group LLP

(57) ABSTRACT

A testing device tests a magnetic head with a read head structure including a read head element while applying an external magnetic field to the magnetic head. The testing device receives signals from the read head element and processes the signals to generate a spectral power density for the signals. The spectral power density is characterized for at least one frequency range. The characterization of the spectral power density is used to determine a characteristic of noise from the read head structure. The signals from the read head may be received with different applied magnetic fields and/or before or while thermally exciting the magnetic head. Additionally, a histogram of the signals may be generated and used to determine a second characteristic of the noise.

40 Claims, 8 Drawing Sheets

SPECTRAL NOISE ANALYSIS FOR READ HEAD STRUCTURES

CROSS-REFERENCE TO RELATED APPLICATION(S)

This application claims priority under 35 USC 119 to U.S. Provisional Application No. 61/643,016, filed May 4, 2012 and entitled "Spectral Noise Analysis for Read Head Structures" which is incorporated herein in its entirety by reference.

BACKGROUND

In order to increase the recording density in hard drive disks, magnetic heads are being produced with an inductive write head element and a magnetoresistive effect (MR) read head element. The basic concept of magnetoresistive element is that resistance of such element changes as a function of applied magnetic field. Such elements can be produced by using an anisotropic magnetoresistive effect (AMR) element, a giant magnetoresistive effect (GMR) element such as a spin-valve MR element or a tunnel magnetoresistive effect (TMR) element to increase element sensitivity.

A magnetic head with a defective read head structure will not follow predictable resistivity changes over the range of magnetic read signals from a disk. Accordingly, it is important to qualify each magnetic head by testing the magnetic head for instabilities or noise.

SUMMARY

A testing device tests a magnetic head with a read head structure including a read head element while applying an external magnetic field to the magnetic head. The testing device receives signals from the read head element and processes the signals to generate a spectral power density for the signals. The spectral power density is characterized for at least one frequency range. The characterization of the spectral power density is used to determine a characteristic of noise from the read head structure. The signals from the read head may be received with different applied magnetic fields and/or before or while thermally exciting the magnetic head. Additionally, a histogram of the signals may be generated and used to determine a second characteristic of the noise.

DETAILED DESCRIPTION

Figure 1:
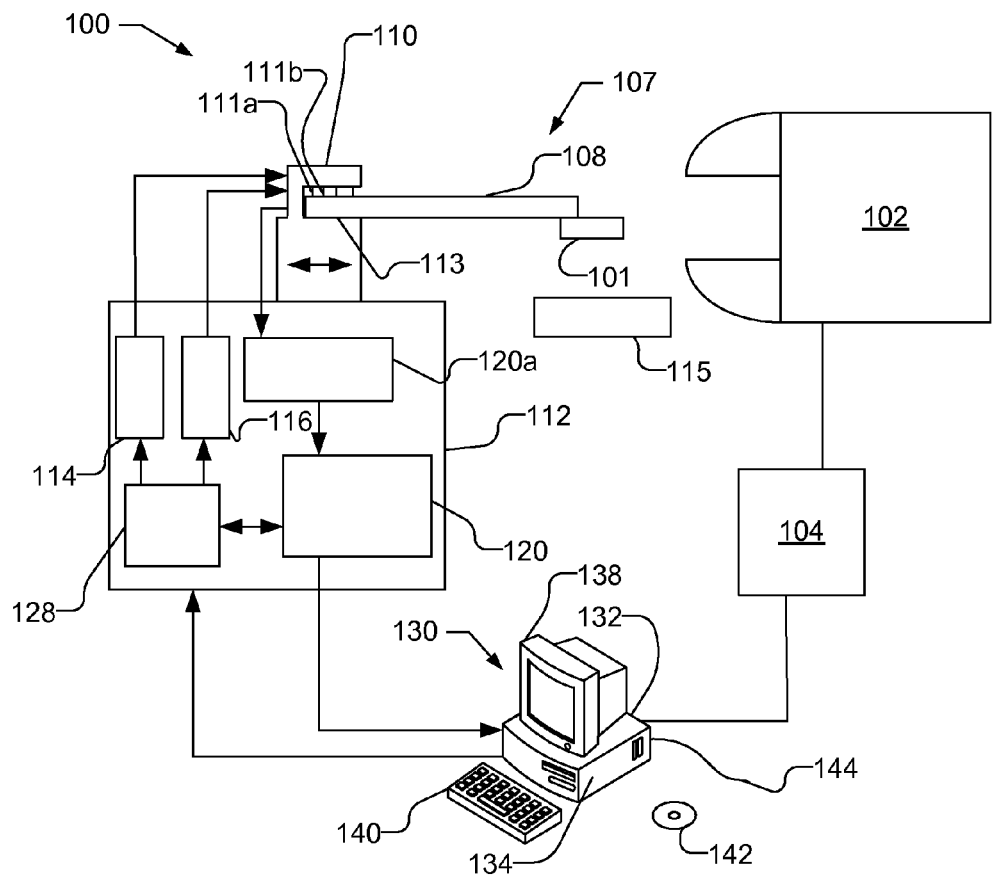
FIG. 1 is a schematic view of a magnetic head testing device that may be used to analyze spectral noise from read head structures.

FIG. 1 is a schematic view of a magnetic head testing device 100 that may be used to analyze spectral noise from read head structures in a magnetic head under test. As is well known in the art, magnetic heads include read head structures, such as read head elements and shield structures. A magnetic head under test may include additional elements, such as a write element, a heating element (used for Dynamic Flying Height), etc.

Testing device 100 includes an electromagnetic coil 102, which e.g., is a C-core electromagnetic coil with windings or a Helmholtz coil, for producing an external magnetic field that is applied to the composite thin-film magnetic head under test. A power supply 104 is connected to the electromagnetic coil 102 and provides the excitation current to the electromagnetic coil 102. The power supply 104 is connected to and controlled by a processor 132. The processor 132 controls the coil 102, via the power supply 104, to turn on or off a magnetic field, which when turned on may be controlled to vary, e.g., to continuously change or incrementally change the magnetic field. Moreover, the parameters of the magnetic field, for example, the magnitude and the cycle length, may be controllable if desired.

The magnetic head 101 under test, which may include an inductive write head element and a MR read head element, is illustrated as being mounted on a suspension 108, composed of a mechanical mounting base and an electrical connector for probe contact. The assembly of the magnetic head 101 and suspension 108 is sometimes referred to generally as head gimbal assembly 107. The head gimbal assembly 107 is mounted on a mounting block 110, which includes probe pins 111a and 111b to make electrical connections to the contacts on the head gimbal assembly 107. An additional electrical connection, i.e., the ground connection, may be made through the contact of upper surface 113 of mounting block and the bottom surface of the suspension 108. The mounting block 110 is movably coupled to the base 112, such that the mounting block 110 and magnetic head 101 can translate towards and away from the electromagnetic coil 102. During testing, the mounting block 110 moves the magnetic head between the electromagnetic coil 102. Other configurations of the magnetic head 101 under test are possible. For example, the magnetic head 101 may be Wafer, Bar, Slider, HGA, HSA, HDA, or Drive configuration. In certain configurations of the magnet head 101, e.g., when the magnetic head is in bar form, the motion operation of the device 100 may change. Further, additional or different components may be used, such as using a Helmholtz coil rather than a "C-core" electromagnetic coil 102.

Two of the probe pins 111a are coupled to the MR read element on the magnetic head and provide the positive and negative read signals (R+ and R−) to the MR read element. The probe pins are connected to a bias circuit 116 that is used to provide a bias current or bias voltage to the MR read element on the magnetic head 101. The bias circuit 116 may include, e.g., a constant current (or voltage) source. When a bias current is used, tester 100 measures fluctuations in voltage and when a bias voltage is used, tester 100 measures fluctuations in current. The probe pins 111a are connected to the noise detection circuit 120 through a read channel 120a (illustrated in FIG. 2). The noise detection circuit 120 is connected to the processor 132 and is used to detect noise of interest.

If desired, one or more other probes, e.g., 111b, may be connected to the write element on the magnetic head, a heater that functions for Dynamic Flying Height, or any other devices that may be present on the magnetic head, which can be powered by one or more power supply circuits 114. These or other devices may be exercised as a stress parameter before and/or during the measurement of the MR Noise and thus are referred to herein as auxiliary devices. Power supply circuit 114 may exercise auxiliary devices by providing DC biasing or bias pulsing at low or high frequencies and with fixed or varying duty cycles. Exercising auxiliary devices is advantageous as part of MR analysis as the auxiliary devices can cause localized thermal stress, mechanical stress, and magnetic field stress that can influence the noise characteristics of the MR. If desired, an external thermal stress element 115 may be included in the device 100, which may thermally stress the magnetic head 101 by convection or conduction, e.g., by ambient heating, laser, or direct contact, etc. The external thermal stress element 115 may be controlled with a separate controller and power supply. For example, a timing circuit 128 coupled to the noise detection circuit 120 may be used to control, e.g., thermal stress element 115 (as illustrated in FIG. 2), as well as bias circuit 116 and circuits 114, and magnetic field power supply 104.

If desired, additional circuitry may be coupled to the output of the MR read element for additional measurements of the magnetic head, e.g., a circuit for measuring p-H characteristics of the head. It should be understood that the testing device 100 is one example of a testing device that may be used with the present invention. Testing device 100, may be e.g., a QST-2002-PLUS tester manufactured by Integral Solutions International, located in Santa Clara, Calif. If desired other testing devices may be used to test magnetic heads before they are connected to the suspension, e.g., when the head is still on the bar or after mounting of the head gimbal assembly to an actuator assembly for testing either as an assembly or when installed into an actual hard disk drive.

The noise detection circuit 120 is coupled to a computer 130 that receives, stores, and analyzes the processed signals. The computer 130 includes a processor 132 with memory 134, as well as a user interface including e.g., a display 138 and input devices 140. A non-transitory computer-usable storage medium 142 having computer-readable program code embodied may be used by the computer 130 for causing the processor to control the device and to perform a desired analysis, as described herein. The data structures and software code for automatically implementing one or more acts described in this detailed description can be implemented by one of ordinary skill in the art in light of the present disclosure and stored, e.g., on a non-transitory computer readable storage medium 142, which may be any device or medium that can store code and/or data for use by a computer system such as processor 132. The computer-usable storage medium 142 may be, but is not limited to, magnetic and optical storage devices such as disk drives, magnetic tape, compact discs, and DVDs (digital versatile discs or digital video discs). A communication port 144 may also be used to receive instructions that are used to program the computer 130 to perform any one or more of the functions described herein and may represent any type of communication connection, such as to the internet or any other computer network. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

Figure 2:
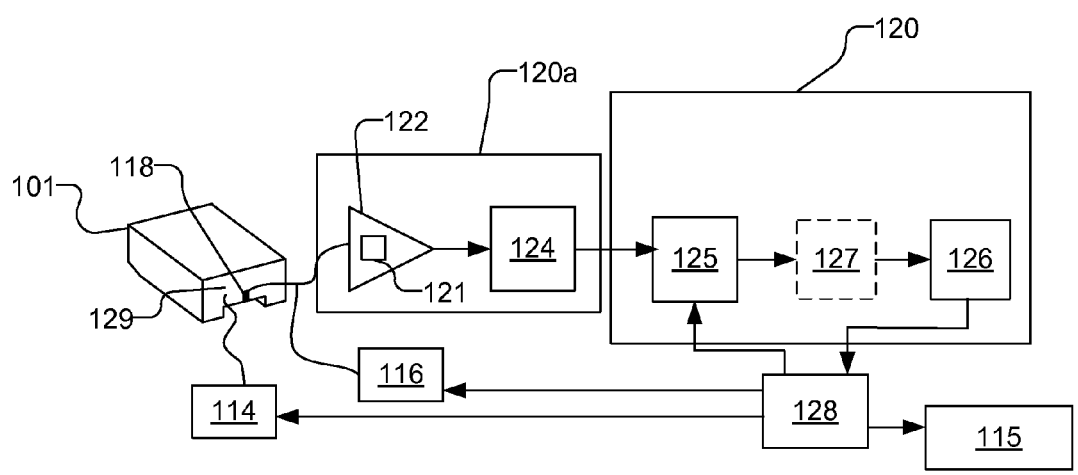
FIG. 2 is a schematic view of the noise detection circuit.

FIG. 2 is a schematic view of the noise detection circuit 120. As illustrated in FIG. 2, an MR read head element 118 on the magnetic head 101, which is mounted on the suspension 108 shown in FIG. 1, is connected to amplifier circuit 122, which is part of a read channel 120a. The MR read head element 118 is also connected to the bias circuit 116. The output terminal of the amplifier circuit 122 produces a high-frequency output of approximately 1 MHz to several hundreds MHz with gain of 270:1. The amplifier circuit 122 may include a high pass filter 121, sometimes referred to as an AC coupling, that eliminates signals from approximately 0 to 1 MHz. Of course, if desired, high pass filter 121 may be external to amplifier circuit 122. It should be understood that the specific output frequency of the amplifier circuit 122 may be varied to any desired frequency by altering the high pass filter 121. The amplifier circuit 122 is connected to a filter 124, which may be a low pass filter or a band pass filter. A low pass filter 124 in the read channel 120a, for example, may pass signals with a frequency less than approximately 160 MHz. Of course, any desired output frequency may be produced with an appropriate low pass filter 124, e.g., up to approximately 200 MHz or more. Thus, the resulting read channel bandwidth is between the cutoff frequencies of the high pass filter 121 in the amplifier circuit 122 and the low pass filter 124, e.g., between approximately 1 MHz to 160 MHz. If desired, the filter 124 may include a plurality of band pass filters with different low and high frequencies, as discussed below. The output of the read channel 120a is received by the noise detection circuit 120.

The use of a high-frequency output advantageously eliminates the DC voltage across the MR read head element 118 that is created by the bias and static resistance of the MR read head element. In addition, because the magnetic field cycles at a low frequency, e.g., up to 1 kHz, the band pass of the read channel 102a (the combined low pass filter 124 and the high pass filter 121 that is part of the amplifier circuit 122) eliminates the predictable and expected corresponding dynamic resistive change in the MR read head element synchronized with the low frequency magnetic field cycle frequency. It should be understood that if desired, the magnetic field in fact may be held at a single steady magnitude. The output terminal of the low pass filter 124 is coupled to a digitizer 125 in the noise detection circuit 120, the digitizer may be, e.g., a 10 bit digitizer with a 500 MHz sampling rate. The magnetic field may be cycled at a frequency that is lower than the AC coupling frequency of the read channel 120a, e.g., the cycle frequency of the magnet 102 and the high pass filter 124 frequency of the read channel 120a may be specifically chosen for this parameter. By cycling the magnetic field at a frequency lower than the AC coupling frequency of the read channel 120a, the resistance response of the MR element 118 due to the lower-frequency magnetic field will be filtered out. Thus, the only signals that will be passed through the read channel 120a are noise and other signals that are higher frequency than the magnetic field operation and within the operating bandwidth of the rest of the read channel 120a.

The digitizer 125 may be coupled to processor 132 in FIG. 1, or noise detection circuit 120 may include a processor 126 that performs the desired analysis on the digitized signals. For example, processor 126 may perform a Fast Fourier Transform (FFT) or Autocorrelation on the signals, or derive the root mean square (RMS) values for the signals. The process includes a computer-usable medium having computer-readable program code embodied therein for causing the processor to perform desired analysis. For example, the code embodied on the computer-usable medium may cause the processor to perform a root mean square calculation on the digitized output signals and/or a Fast Fourier Transform or Autocorrelation on the digitized signals to determine if the magnetic head produces noise. For example, the program code to perform the RMS, FFT, and/or Autocorrelation calculations may be MathLab or Measurement Studio. It should be understood that a separate processor 126 may be used with noise detection circuit 120 or if desired, processor 132 shown in FIG. 1 may be used in place of processor 126. The noise detection circuit 120 may be fully in hardware, such as a DSP (Digital Signal Processor) or in software, or a combination of both, e.g., digitizer 125 may be hardware while processor 126 may be inside the computer 130 shown in FIG. 1. Additionally, the noise detection circuit 120 may also be an RMS Meter, which can also have its own hardware or software filter that further limits the bandwidth of the measurement, where this narrower bandwidth would be within the read bandwidth of the read channel 120a, and this bandwidth may be varied to record RMS and other parameters and a plurality of reduced bandwidths. Hardware bandwidth filtering may be used with applications such as a hardware DSP or RMS meter, and software or hardware bandwidths may be used with if the processor 126 is in the computer 130.

A timing circuit 128 may be connected between processor 126 and digitizer 125. Timing circuit 128 controls when digitizer 125 digitizes signals received by MR read head element 118. Timing circuit 128 may also be connected to the bias controller 116 to turn on and off the bias to the MR element 118 as a stress for the noise analysis. Additionally or alternatively, the timing circuit 128 may be connected to circuit 114 to control when an auxiliary device is exercised. The timing controller 128 may also be connected to the magnet power supply 104 shown in FIG. 1, as well as an external thermal device which may be used as a stress for the noise analysis. Also, the timing controller 128 may be connected to the external thermal element 115. The timing circuit 128 may be implemented in hardware or software. Thus, the timing circuit 128 may be used to control the exercise of any auxiliary device on the head, the MR bias, the magnetic field, and an external thermal system in any desired manner, e.g., either a pulsed or DC frequency, or any other combination either before or during the MR read processing.

Figure 3:
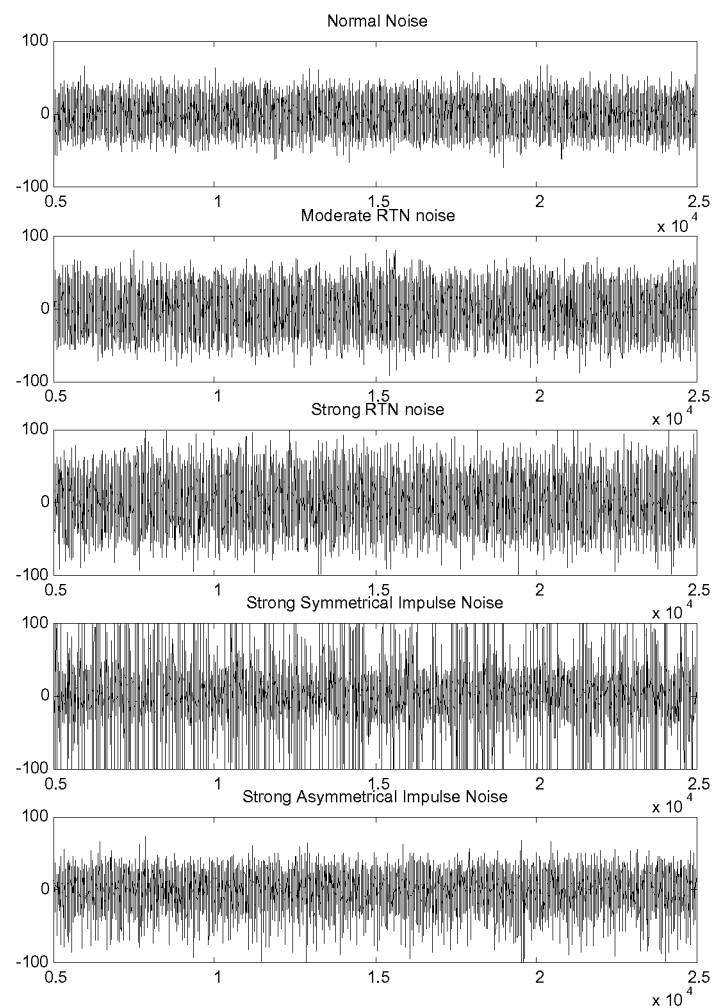
FIG. 3 illustrates typical noise patterns that may be produced in a 50 μs timespan.

FIG. 3 illustrates typical noise patterns that may be produced by the MR and passed through the read channel 120a over a 50 μs timespan, the x axis illustrating the sample count, where each sample is 2 ns. The top trace is considered "normal" noise. The overall envelope of the top trace has little low-frequency oscillations, and thus, the noise statistics are almost "Gaussian" with a small degree of low frequency variations.

The second trace has moderate random telegraph noise (RTN) showing a slightly higher noise amplitude, but more clearly seen non-stationary events (stronger low frequency modulation). The third trace has strong RTN noise with relatively short temporal segments of regular noise on top of a changing background. The low-frequency noise modulation can be caused by different effects, such as domains in the free and reference layer, tunnel barrier noise (even acoustical noise induced by electron movement), some amounts of pinholes. These are usually described in terms of RTN. For example, of sensor resistance switches between several states, it will look like superposition of regular "Gaussian" noise on top of low frequency background variations.

Traces 4 and 5 show "impulse" noise with high amplitude, with strong symmetrical impulse noise (trace 4) and asymmetrical impulse noise (mainly negative spikes—trace 5).

Figure 4:
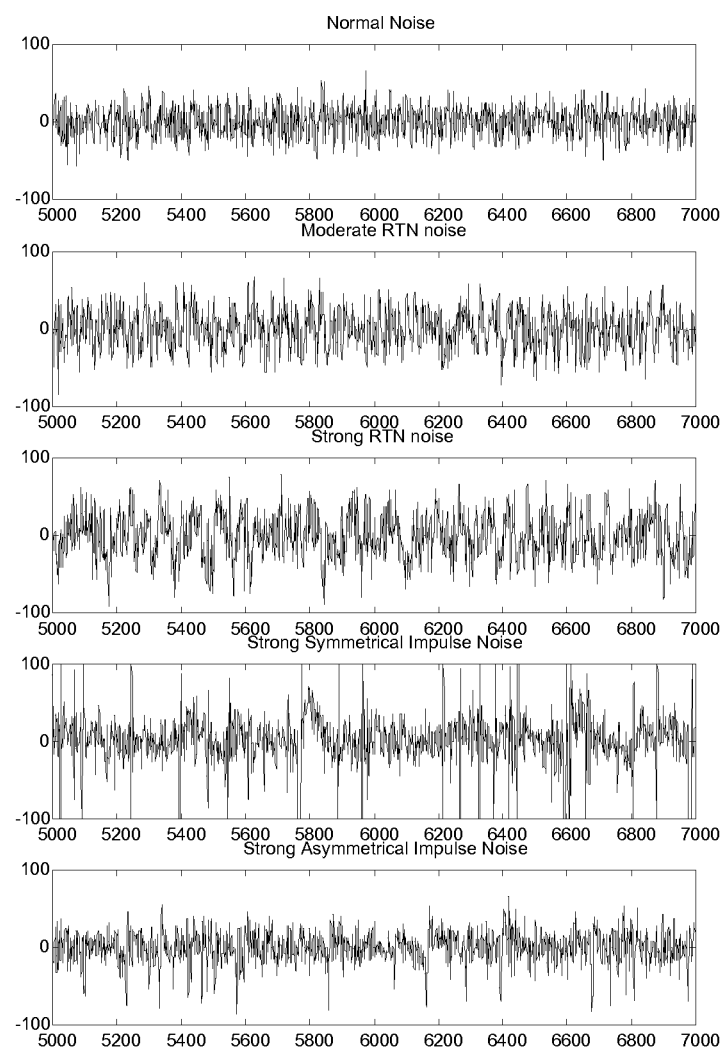
FIG. 4 illustrates a magnified portion of FIG. 3 in a 4 μs timespan.
Figure 5:
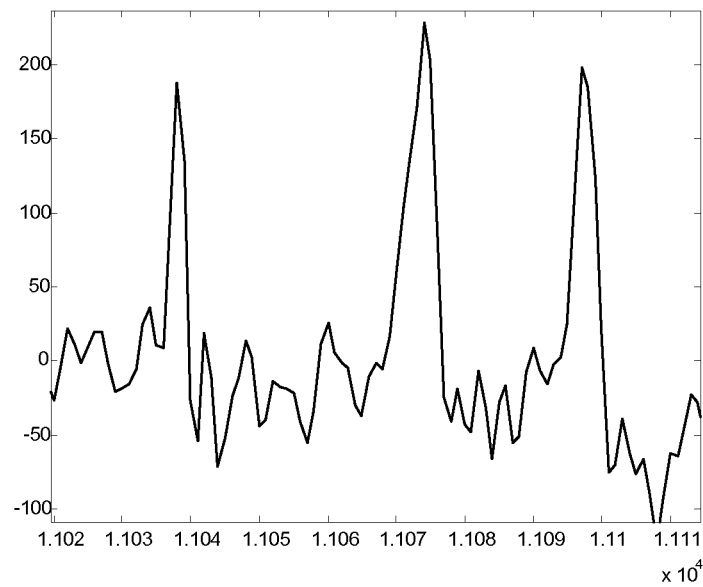
FIG. 5 shows 200 ns timespan of an impulse noise trace.

FIG. 4 illustrates a magnified portion of FIG. 3 over a 4 μs timespan. More details of random events are visible, for example RTN modulation is clearer in the second and third traces. FIG. 5 shows 200 ns timespan of the impulse noise trace from FIG. 3. As can be seen, these pulses appear to be less than 1 ns wide and are limited by the channel response (160 MHz filter). Also, the 3 MHz AC coupling cut-off frequency used in this particular read channel creates visible undershoot after each noise spike event.

The testing device 100 may be used to provide a quantitative measure of spectral noise, such as that illustrated in FIGS. 3, 4, and 5. One method of characterizing the read head structure in a sample is to analyze the spectral power density, i.e., power spectrum, in different frequency bands of the spectral noise produced by the read head element.

Figure 6:
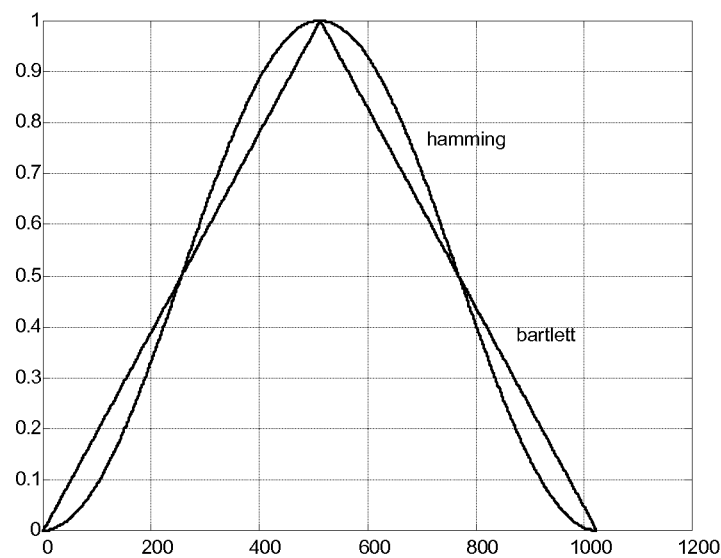
FIG. 6 illustrates hamming and bartlett window functions.

One method of generating a power spectrum is to record signals from a read head element in the magnetic head 101, e.g., over 50 μs (as illustrated in FIG. 3) or other length and to perform a periodogram on the recorded signals. The recorded signals are split into N segments, e.g., 25000 samples may be split into segments of 1024 points each. Each segment is multiplied by a window function, e.g., hamming, hunning, barlett, etc. in order to minimize edge distortions. FIG. 6 illustrates hamming and bartlett window functions. With the segment signal being Si and the window function W, the window application results in Si*W (window is centered at the segment center). The Fast Fourier transform (FFT) of each segment is calculated:

$$Fi = \text{FFT}(Si*W). \qquad \text{eq. 1}$$

The absolute values of the spectra are squared and averaged to generate the spectral power density, i.e., power spectrum:

$$\text{Power\_Spectrum} = \Sigma \frac{Fi^2}{N}. \qquad \text{eq. 2}$$

Figure 7:
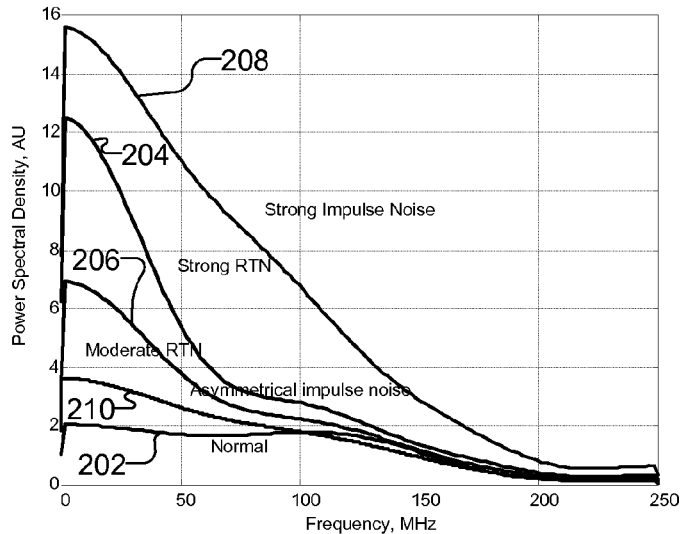
FIG. 7 illustrates the power spectrum for the captured signals from FIG. 3.

FIG. 7 illustrates the power spectrum for the captured signals from FIG. 3. As can be seen, the normal noise curve 202 has a reasonably flat spectrum, while the strong RTN and moderate noise curves 204 and 206 shows 1/f type noise power, which has a maximum up to about 50 MHz. Strong symmetrical impulse noise curve 208 has approximately linear, high power spectra up to channel cut-off frequency. The strong asymmetrical impulse noise curve 210 shows moderate noise power up to 100 MHz, which is related to the relatively low density of strong noise spikes.

Thus, a spectral analysis of the power spectrum catches typical noise signatures in most cases. The spectrum may be analyzed, e.g., by characterizing the shape of the noise spectrum one or more frequency ranges, and in particular the lower ranges, e.g., 3-100 MHz, and using the characterization to determine a characteristic of the noise from the read head structure. One method of characterizing the shape of the noise spectrum is to determine the flatness of the spectrum. For example, values of integrated noise power for one or more frequency ranges of the power spectrum, e.g., 5-30 MHz, 30-55 MHz, 50-100 MHz, and 100-150 MHz, maybe determined and a ratio of the values for the different frequency bands, e.g., lower frequency band (5-30 MHz relative to higher frequency band 100-150 MHz) may be determined. Other frequency bands may be used as well or in the alternative. By way of example, the normal noise curve 202 will show a ratio of Power (5-30 MHz)/Power (100-150 MHz) that is close to 1, while the RTN noise curves 206 and 204 will have factors of approximately 2.5 and 4. Thus, by determining the ratio of powers and comparing to thresholds, which may be empirically or theoretically determined, the noise may be characterized, e.g., the amount of noise and type of noise may be determined.

Another way to characterize shape of the noise spectrum is to compare averages for the noise value in one or more frequency bands. For example, an average of the noise values in one or more frequency bands, e.g., 5-30 MHz, 30-55 MHz, 50-100 MHz, and 100-150 MHz, may be compared to each other or to an average of a larger frequency band, e.g., 3-160 MHz. By way of example, the normal noise curve 202 will have ratios that are approximately 1 for all frequency bands when compared to a large frequency band of 3-160 MHz, while RTN noise curves 204 and 206 will have ratios greater than 1 for 0-50 MHz and approximately 1 for higher frequencies. Impulse noise curves 208 and 210 will have a ratio greater than 1 for low frequencies (0-50 MHz) and less than 1 for higher bands (100-150 MHz). Thus, by determining the ratio of average noise values for frequency band compared to the average noise value for the spectrum and comparing to thresholds, which may be empirically or theoretically determined, the noise may be characterized, e.g., the amount of noise and type of noise may be determined.

If desired, other statistical techniques, as will be well understood by those skilled in the art in light of the present disclosure may be similarly employed to characterize the noise produced by the read head structure.

Another way that the spectral power density in different frequency bands may be determined is to use a set of discrete band-pass filters. For example, filter 124 in FIG. 2 may be a set of analog band pass filters that are defined by the desired frequency bands to be analyzed, e.g., 5-30 MHz, 30-55 MHz, 50-100 MHz, 100-150 MHz, and 5-150 MHz. The processor 126 (or processor 132) may derive the RMS values of the signals for each frequency band, which is equivalent to determining the square root of the power spectra in each frequency band. Alternatively, an optional set of digital band pass filters 127 may be used, e.g., between digitizer 125 and processor 126, and the processor 126 (or processor 132) may derive the RMS values for each frequency band. Alternatively, desired band pass filters may be in software, e.g., in the non-transitory computer-usable storage medium 142 that cause the processor 132 to perform the desired band pass filtering.

Moreover, it should be understood that spectra to be analyzed may be produced for each sample in different environments. For example, spectra may be produced in different magnetic fields, e.g., produced by coil 102, including no magnetic field and magnetic fields having different magnitudes and/or different orientations. Additionally, spectra may be produced while the sample is thermally excited, e.g., using an environmental heater 115 or a heater that is in the structure of the sample. The thermal excitation may be used to pre-stress the sample and/or may be left on during measurement. Additionally, the spectra may be produced after or while one or more auxiliary devices, such as a heater or a write element on the magnetic head 101, is exercised, e.g., either pulsed or steady.

Figure 8:
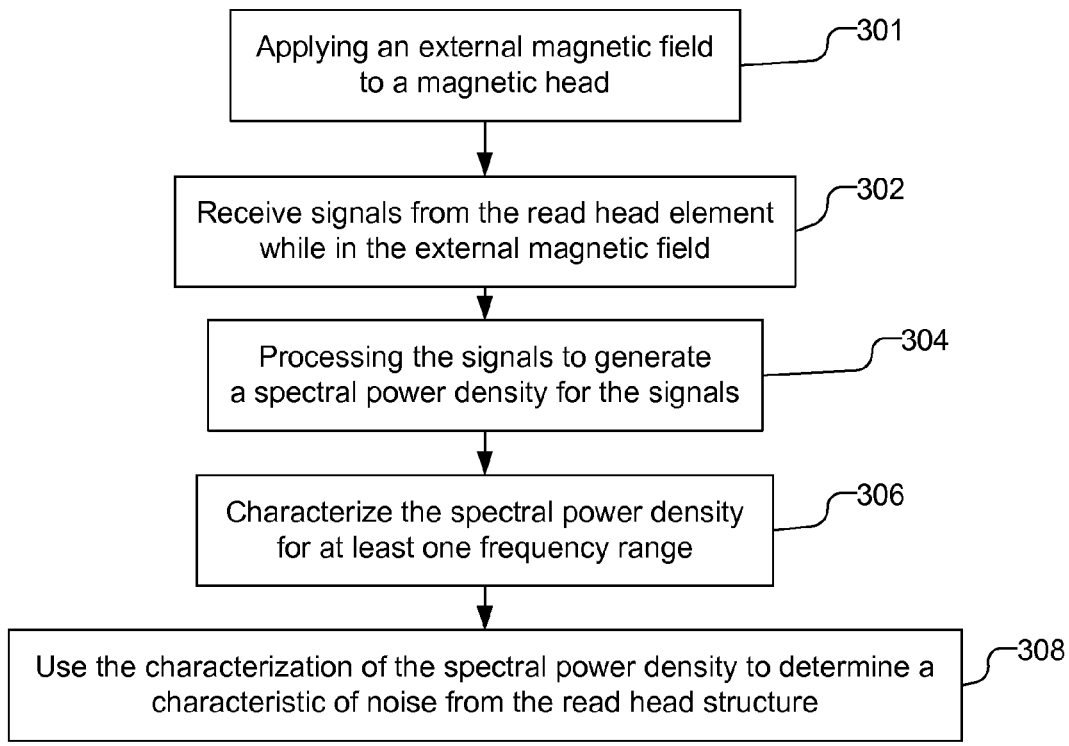
FIG. 8 illustrates a flow chart of the process of testing a magnetic head with a read head structure including a read head element.

Thus, FIG. 8 illustrates a flow chart of the process of testing a magnetic head with a read head structure including a read head element. As illustrated, an external magnetic field is applied to the magnetic head (301) and signals are received from the read head element while in the external magnetic field (302). By way of example, the signals may be received while varying the external magnetic field to the magnetic head, after or while exercising one or more auxiliary devices on the magnetic head, such as thermally exciting the magnetic head using a heater in a structure of the magnetic head, and/or after or while generating at least one of a pulse or steady write signal.

The signals are processed to generate a spectral power density for the signals (304). For example, the spectral power density for the signals may be determined using a Fast Fourier Transform on the signals, e.g., by squaring and averaging the Fast Fourier Transform of a plurality of windowed segmented signals from the signals. Alternatively, the spectral power density for the signals may be determined by band pass filtering the signals for a plurality of frequency ranges and deriving the root mean square values for the signals in each of the plurality of frequency ranges. The band pass filtering is performed using at least one of analog band pass filters, digital band pass filters and program code that causes a process to perform the band pass filters.

The spectral power density for at least one frequency range is characterized (306) and used to determine a characteristic of noise from the read head structure (308), which may be used to accept or reject a read head structure. For example, if a particular noise characteristic is determined to be beyond a set user limit, the head may be considered failing. Characterizing the spectral power density for the plurality of frequency ranges may be characterizing a shape of the spectral power density in each frequency range to determine a flatness of the spectral power density for the signals. The shape of the spectral power density may be characterized in each frequency range by integrating the spectral power density over each frequency range. The spectral power density may be characterized for the plurality of frequency ranges by determining average values of the spectral power density in each frequency range. Another example of characterization of noise is to categorize or bin the heads into different noise types, as not all noise types may require a failure of the head. For example, the read channel of some disk drives may be able to use a read head that exhibits RTN noise, but may not be able to use a read head with moderate impulse noise. Thus, multiple types of noise may be characterized with different pass/fail criteria for magnetic heads under test. For example, a magnetic head under test may be characterized for both "noise RMS for RTN noise" as well as "noise RMS for impulse noise" and/or any additional noise types if desired.

A first characterization of the spectral power density for a first frequency range is compared to a second characterization of the spectral power density for a second frequency range, the second frequency range including frequencies that are greater than frequencies in the first frequency range. For example, the first frequency range includes frequencies below 50 MHz and the second frequency range includes frequencies above 100 MHz.

The comparison of the first and second characterizations of the spectral power density may be used to determine a characteristic of noise from the read head structure. For example, the comparison of the first and second characterizations of the spectral power density may be, in the form of, e.g., a difference or ratio, etc. which may then be compared to a threshold to determine the characteristic of the noise.

Figure 9:
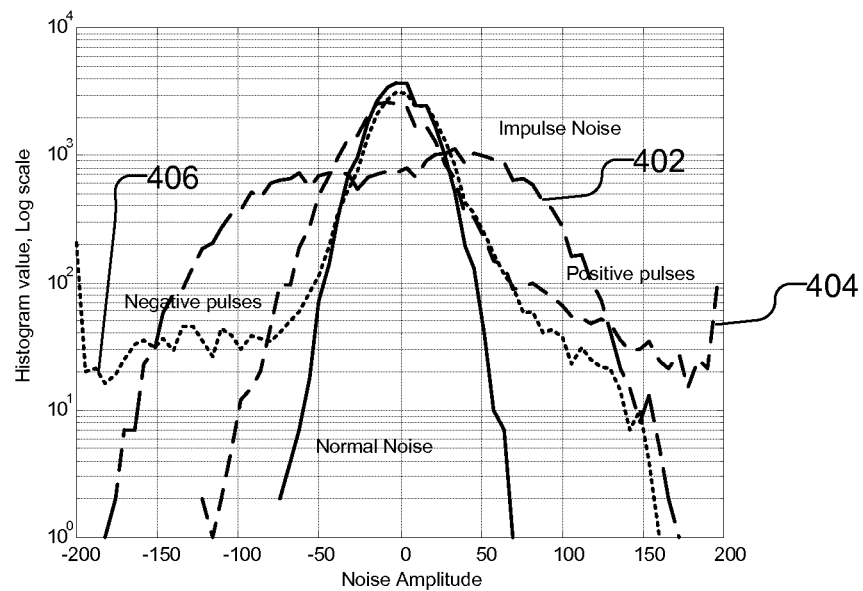
FIG. 9 are plots of amplitude histograms on logarithmic scale for different noise patterns.

Analysis of the spectral density over the frequency bands provides a good analysis of the noise, but additional information may be desired, particularly for the impulse noise. A noise distribution analysis may be used to further characterize the noise. A noise distribution analysis may be, e.g., in the form of a histogram. FIG. 9 shows plots of amplitude histograms on logarithmic scale for the different noise patterns.

As can be seen in FIG. 9, the "normal" noise curve has a symmetrical and relatively narrow histogram. Low frequency RTN noise curves will have similar and symmetrical distribution with a larger amplitude spread. However, impulse noise results in histogram asymmetry. As can be seen in FIG. 9, positive vs. negative noise levels may be clearly identified using an amplitude histogram. Additionally, the trace 402 corresponds to a strong pulse noise with two shallow peaks different from zero noise level, corresponding to higher probability of certain amplitude levels.

Thus, a magnetic head with a read head structure including a read head element may be tested by applying an external magnetic field and receiving signals from the read head element while in the external magnetic field. As discussed above, the signals may be received while varying the external magnetic field to the magnetic head, after or while exercising one or more auxiliary devices on the magnetic head, such as thermally exciting the magnetic head using a heater in a structure of the magnetic head, and/or after or while generating at least one of a pulse or steady write signal. A noise distribution analysis of the received signals, e.g., in the form of a histogram, may be used may be used to characterize the noise. Parameters that may be extracted from the histogram include, e.g., the width at some % to maximum or zero level, peak or peaks, and asymmetry at a given level, e.g. 1% relative to peak. For example, as illustrated in FIG. 9, trace 404, which from signals with mainly positive peaks, produces a histogram with noise amplitude values of approximately +150 to −70 at roughly 50% peak, while trace 406, which is from signals with mainly negative peaks, produces a histogram with noise amplitude values of approximately −150 to 100 at roughly 50% peak. Thus, using a difference, ratios or other appropriate statistical analysis of such data, asymmetry in the noise distribution may be identified. The impulse noise from trace 402 may similarly be identified by appropriate analysis of the histogram data, e.g., maximum and minimum of noise amplitude.

Figure 10:
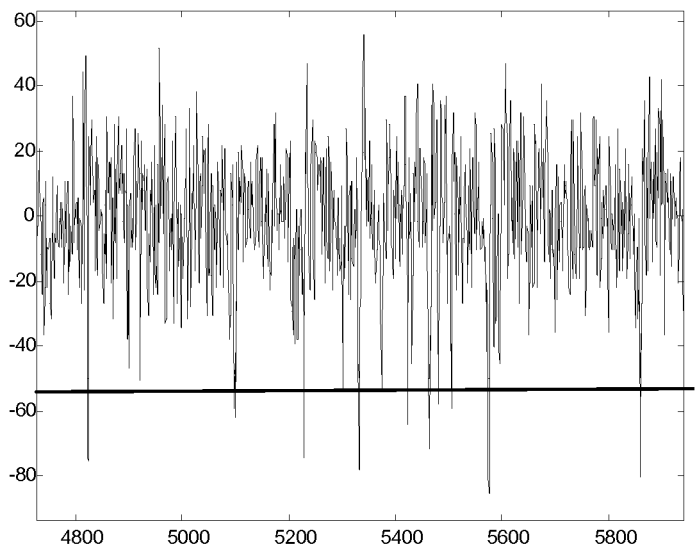
FIG. 10 illustrates a capture of a typical noise with a threshold set at a value of −55.

Another useful method for characterizing noise is the time spent by a noise process above or below a predetermined amplitude level. Thus, the signals received from the head, e.g., in different magnetic fields, may be analyzed to characterize the time spent by noise at a particular amplitude level. FIG. 10, for example, illustrates capture of a typical noise with a threshold set at a value of −55. For a given level (−55), the count of the number of samples smaller than −55 may be divided by the total number of samples to characterize the time spent by noise at a predetermined amplitude level. For FIG. 10, there are 2000 samples, where 30 samples are below −55 level, giving a 0.015 value. This process may be repeated for the desired noise span.

Figure 11:
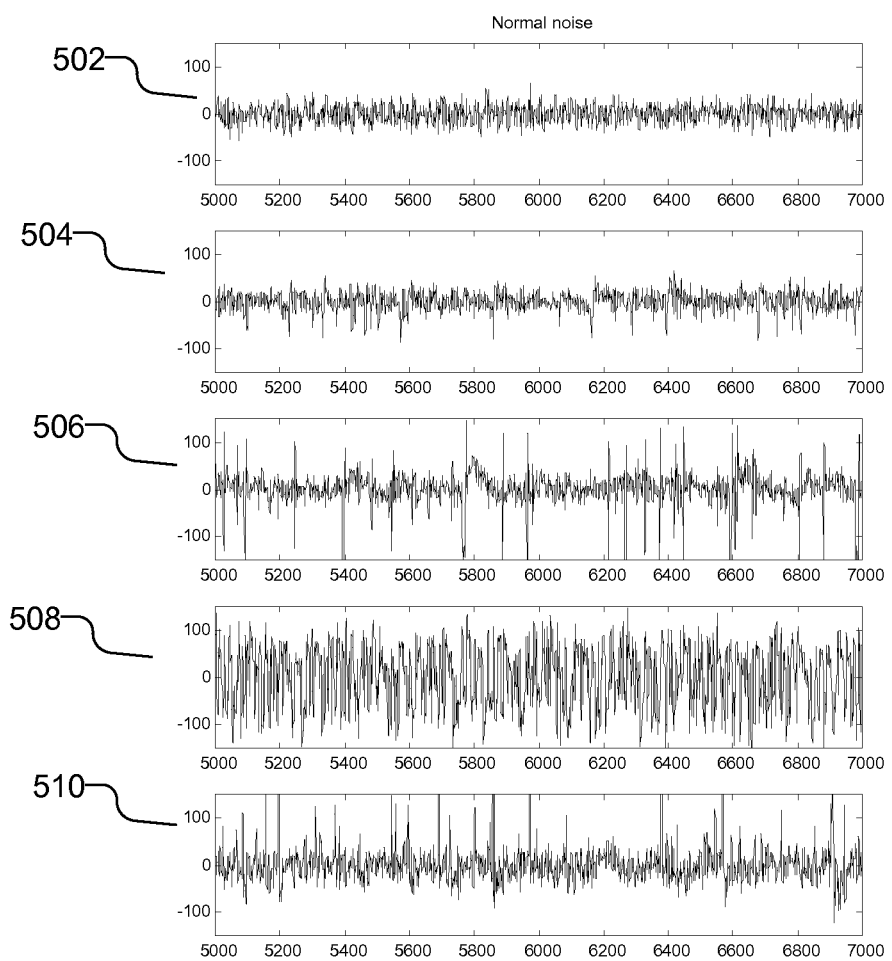
FIG. 11 illustrates several noise traces having different statistics, with normal quasi-white noise and different amount and polarity of spikes.

FIG. 11 illustrates several noise traces having different statistics, with normal quasi-white noise and different amount and polarity of spikes. For example, trace 502 is normal, trace 504 has a small number of negative spikes, trace 506 has asymmetrical bipolar spikes, trace 508 has strong bipolar noise-black, and trace 510 has positive only spikes.

Figure 12:
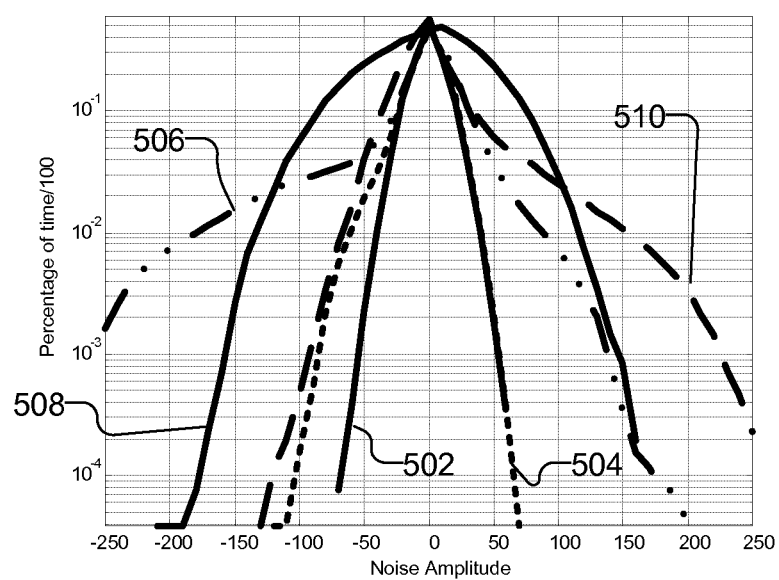
FIG. 12 illustrates a histogram for the traces of FIG. 11.

FIG. 12 illustrates a histogram with like designated traces showing the percentage of time spent by the noise in FIG. 11 above an amplitude level. As can be seen in FIG. 12, the time-above level distribution catches main features of noise statistics and asymmetry. Reporting histogram negative and positive width at a fixed level (e.g., somewhere between 0.01 and 0.001) may characterize noise level and asymmetry. For example, trace 502 (regular noise) has values −50 to +50 and a width of 100. Trace 504 (small number of negative spikes) has values of −80 to +50 and a width of 130. Trace 506 (strong negative spikes) has values of −250 to +100 and a width of 350, and trace 510 (strong positive spikes) has values of −80 to +200 and a width of 280.

Thus, histograms can provide additional characterization of the noise. The histograms may be applied for signals received at one or more magnetic fields and be used to plot histogram parameters vs. magnetic field. Moreover, a histogram for a head under test may be compared to a histogram from a known "good" head, e.g., as a Mean-Square-Error that is compared to a threshold, to indicate whether the head under test is a good head or bad head, i.e., pass/fail head screening. Moreover, the histogram from a head under test may be used to provide insight into the type of noise the head under test is producing, as described above, in a failure analysis.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of testing a magnetic head with a read head structure including a read head element, the method comprising:
    applying an external magnetic field to the magnetic head;
    receiving signals from the read head element while in the external magnetic field;
    processing the signals comprising splitting the signals into a plurality of segments and multiplying each segment by a window function to produce a plurality of windowed segmented signals and processing the plurality of windowed segmented signals to generate a spectral power density for the signals;
    characterizing the spectral power density for at least one frequency range; and
    using the characterization of the spectral power density to determine a characteristic of noise from the read head structure.

2. The method of claim 1, wherein using the characterization of the spectral power density comprises:
    comparing a first characterization of the spectral power density for a first frequency range to a second characterization of the spectral power density for a second frequency range, the second frequency range including frequencies that are greater than frequencies in the first frequency range; and
    using the comparison of the first characterization to the second characterization to determine the characteristic of the noise from the read head structure.

3. The method of claim 1, wherein processing the plurality of windowed segmented signals to generate the spectral power density comprises using a Fast Fourier Transform.

4. The method of claim 3, wherein using the Fast Fourier Transform comprises squaring and averaging the Fast Fourier Transform of the plurality of windowed segmented signals.

5. The method of claim 1, wherein processing the signals to generate the spectral power density comprises band pass filtering the signals for a plurality of frequency ranges and deriving root mean square values for the signals in each of the plurality of frequency ranges.

6. The method of claim 5, wherein the band pass filtering is performed using at least one of analog band pass filters, digital band pass filters and program code that causes a processor to perform the band pass filtering.

7. The method of claim 2, wherein the first characterization of the spectral power density for the first frequency range is a first shape of the spectral power density and the second characterization of the spectral power density for the second frequency range is a second shape of the spectral power density and comparing the first characterization to the second characterization provides a determination of a flatness of the spectral power density for the signals.

8. The method of claim 7, wherein characterizing the spectral power density for at least one frequency range comprises integrating the spectral power density over the first frequency range to generate the first shape and integrating the spectral power density over the second frequency range to generate the second shape.

9. The method of claim 2, wherein the first characterization of the spectral power density for the first frequency range and the second characterization of the spectral power density for the second frequency range are average values of the spectral power density in each frequency range.

10. The method of claim 2, wherein using the comparison of the first characterization to the second characterization comprises thresholding the comparison of the first characterization to the second characterization to determine the characteristic of the noise.

11. The method of claim 2, wherein the first frequency range includes frequencies below 50 MHz and the second frequency range includes frequencies above 100 MHz.

12. The method of claim 1, further comprising:
varying the external magnetic field that is applied to the magnetic head; and
receiving signals from the read head element at different external magnetic fields.

13. The method of claim 1, further comprising exercising one or more auxiliary devices on the magnetic head before or while receiving the signals.

14. The method of claim 13, wherein exercising one or more auxiliary devices comprises thermally exciting the magnetic head using a heater in a structure of the magnetic head.

15. The method of claim 13, wherein exercising one or more auxiliary devices comprises generating at least one of a pulse or steady write signal before or while receiving the signals.

16. The method of claim 1, further comprising thermally exciting the magnetic head before or while receiving the signals using an environmental heater.

17. The method of claim 1, further comprising generating a histogram of the signals received from the read head element and using the histogram to determine a second characteristic of the noise.

18. The method of claim 17, wherein the histogram is used to determine the second characteristic by analyzing amplitudes of histogram values, wherein the second characteristic is one of a measure of a width, a peak and asymmetry.

19. The method of claim 1, further comprising using the signals received from the read head element to determine a percentage of time above or below a predetermined amplitude level.

20. The method of claim 1, wherein the magnetic head is in one of the following configurations, Wafer, Bar, Slider, HGA, HSA, HDA, and Drive configuration.

21. An apparatus for testing a magnetic head with a read head structure including a read head element, the apparatus comprising:
a magnetic field generator configured to apply an external magnetic field to the magnetic head;
a digitizer electrically coupled to the read head element through a read channel, the digitizer receives signals from the read head element while the magnetic head is in the external magnetic field and produces digitized signals;
at least one processor coupled to the digitizer to receive the digitized signals, the processor configured to split the digitized signals into a plurality of segments and multiply each segment by a window function to produce a plurality of windowed segmented signals and process the plurality of windowed segmented signals to generate a spectral power density for the digitized signals, to characterize the spectral power density for at least one frequency range; and to use the characterization of the spectral power density to determine a characteristic of noise from the read head structure.

22. The apparatus of claim 21, wherein the processor is configured to use the characterization of the spectral power density by being configured to:
compare a first characterization of the spectral power density for a first frequency range to a second characterization of the spectral power density for a second frequency range, the second frequency range including frequencies that are greater than frequencies in the first frequency range; and
use the comparison of the first characterization to the second characterization to determine the characteristic of the noise from the read head structure.

23. The apparatus of claim 21, wherein the processor is configured to process the plurality of windowed segmented signals to generate the spectral power density by being configured to use a Fast Fourier Transform.

24. The apparatus of claim 23, wherein the processor is configured to use the Fast Fourier Transform by being configured to square and average the Fast Fourier Transform of the plurality of windowed segmented signals.

25. The apparatus of claim 21, wherein the processor is configured to generate the spectral power density by being configured to band pass filter the digitized signals for a plurality of frequency ranges and derive root mean square values for the signals in each of the plurality of frequency ranges.

26. The apparatus of claim 21, further comprising a band pass filter coupled to the digitizer, the band pass filter configured to band pass filter the signals for the plurality of frequency ranges, wherein the processor is further configured to derive root mean square values for the signals in each of the plurality of frequency ranges.

27. The apparatus of claim 22, wherein the first characterization of the spectral power density for the first frequency range is a first shape of the spectral power density and the second characterization of the spectral power density for the second frequency range is a second shape of the spectral power density and the processor is configured to compare the first characterization to the second characterization to determine a flatness of the spectral power density for the signals.

28. The apparatus of claim 27, wherein the processor is configured to characterize the spectral power density for at least one frequency range by being configured to integrate the spectral power density over the first frequency range to generate the first shape and integrate the spectral power density over the second frequency range to generate the second shape.

29. The apparatus of claim 22, wherein the first characterization of the spectral power density for the first frequency range and the second characterization of the spectral power density for the second frequency range are average values of the spectral power density in each frequency range.

30. The apparatus of claim 22, wherein the processor is configured to use the comparison of the first characterization to the second characterization by being configured to compare the comparison of the first characterization to the second characterization to a threshold to determine the characteristic of the noise.

31. The apparatus of claim 22, wherein the first frequency range includes frequencies below 50 MHz and the second frequency range includes frequencies above 100 MHz.

32. The apparatus of claim 21, wherein the magnetic field generator generates a varying external magnetic field that is applied to the magnetic head, and wherein the digitizer receives signals from the read head element while the magnetic head is in different external magnetic fields.

33. The apparatus of claim 21, further comprising a power supply circuit coupled to one or more auxiliary devices on the magnetic head, the power supply circuit being configured to exercise the one or more auxiliary devices before or while the digitizer receives signals from the read head element.

34. The apparatus of claim 33, wherein the one or more auxiliary devices comprises a heater in a structure of the magnetic head, wherein the heater is thermally excited by the power supply circuit.

35. The apparatus of claim 33, wherein the power supply circuit is configured to produce at least one of a pulse or steady write signal to a write element on the magnetic head before or while the digitizer receives signals from the read head element.

36. The apparatus of claim 21, further comprising an environmental heater configured to thermally excite the magnetic head before or while the digitizer receives signals from the read head element.

37. The apparatus of claim 21, wherein the processor is further configured to generate a histogram of the digitized signals and to use the histogram to determine a second characteristic of the noise.

38. The apparatus of claim 37, wherein the processor is configured to use the histogram to determine the second characteristic by being configured to analyze amplitudes of histogram values, wherein the second characteristic is one of a measure of a width, a peak and asymmetry.

39. The apparatus of claim 21, wherein the processor is configured to use the digitized signals to determine a percentage of time above or below a predetermined amplitude level.

40. The apparatus of claim 21, wherein the magnetic head is in one of the following configurations, Wafer, Bar, Slider, HGA, HSA, HDA, and Drive configuration.

* * * * *